(12) United States Patent
Kabacik

(10) Patent No.: US 9,935,343 B2
(45) Date of Patent: Apr. 3, 2018

(54) METHOD OF CYCLING A LITHIUM-SULPHUR CELL

(71) Applicant: Oxis Energy Limited, Oxfordshire (GB)

(72) Inventor: Lukasz Kabacik, Oxfordshire (GB)

(73) Assignee: Oxis Energy Limited, Oxfordshire (GB)

(*) Notice: Subject to any disclaimer, the term of this patent is extended or adjusted under 35 U.S.C. 154(b) by 122 days.

(21) Appl. No.: 14/768,677

(22) PCT Filed: Mar. 21, 2014

(86) PCT No.: PCT/GB2014/050890
§ 371 (c)(1),
(2) Date: Aug. 18, 2015

(87) PCT Pub. No.: WO2014/155069
PCT Pub. Date: Oct. 2, 2014

(65) Prior Publication Data
US 2016/0006084 A1 Jan. 7, 2016

(30) Foreign Application Priority Data

Mar. 25, 2013 (EP) .................................... 13160756
Dec. 9, 2013 (GB) .................................. 1321703.9

(51) Int. Cl.
*H02J 7/00* (2006.01)
*H01M 10/46* (2006.01)
(Continued)

(52) U.S. Cl.
CPC ......... *H01M 10/46* (2013.01); *H01M 10/052* (2013.01); *H01M 10/44* (2013.01); *H02J 7/007* (2013.01); *H01M 2010/4271* (2013.01)

(58) Field of Classification Search
USPC ................................ 320/132, 134, 162, 164
See application file for complete search history.

(56) References Cited

U.S. PATENT DOCUMENTS 3,030,720 A 4/1962 Osswald et al.
3,185,590 A 5/1965 Mayer et al.
(Continued)

FOREIGN PATENT DOCUMENTS

CN 1389948 1/2003
EP 764489 3/1997
(Continued)

OTHER PUBLICATIONS

Jeon et al. Solvent-Free Polymer Electrolytes Based on Thermally Annealed Porous P(VdF-HFP)/P(EO-EC) Membranes.
(Continued)

*Primary Examiner* — Brian Ngo
(74) *Attorney, Agent, or Firm* — Meyertons, Hood, Kivlin, Kowert & Goetzel, P.C.; Mark R. DeLuca

(57) ABSTRACT

A method for cycling a lithium-sulphur cell, said method comprising discharging a lithium-sulphur cell, terminating the discharge when the voltage of the cell reaches a threshold discharge voltage that is in the range of 1.5 to 2.1V, charging the lithium-sulphur cell, and terminating the charge when the voltage of the cell reaches a threshold charge voltage that is in the range of 2.3 to 2.4V, wherein the lithium-sulphur cell is not fully charged at the threshold charge voltage, and wherein the lithium-sulphur cell is not fully discharged at the threshold discharge voltage.

15 Claims, 5 Drawing Sheets

(51) Int. Cl.
*H01M 10/052* (2010.01)
*H01M 10/44* (2006.01)
*H01M 10/42* (2006.01)

(56) References Cited

U.S. PATENT DOCUMENTS

| | | | |
|---|---|---|---|
| 3,578,500 A | 5/1971 | Maricle et al. |
| 3,639,174 A | 2/1972 | Kegelman |
| 3,721,113 A | 3/1973 | Hovsepian |
| 3,778,310 A | 12/1973 | Garth |
| 3,877,983 A | 4/1975 | Hovsepian |
| 3,907,591 A | 9/1975 | Lauck |
| 3,907,597 A | 9/1975 | Mellors |
| 3,951,688 A | 4/1976 | Pankow et al. |
| 4,060,674 A | 11/1977 | Klemann et al. |
| 4,104,451 A | 8/1978 | Klemann et al. |
| 4,118,550 A | 10/1978 | Koch |
| 4,154,906 A | 5/1979 | Bubnick et al. |
| 4,163,829 A | 8/1979 | Kronenberg |
| 4,218,523 A | 8/1980 | Kalnoki-Kis |
| 4,252,876 A | 2/1981 | Koch |
| 4,303,748 A | 12/1981 | Armand et al. |
| 4,318,430 A | 3/1982 | Perman |
| 4,410,609 A | 10/1983 | Peled et al. |
| 4,499,161 A | 2/1985 | Foos |
| 4,503,234 A | 3/1985 | Huwiler et al. |
| 4,550,064 A | 10/1985 | Yen et al. |
| 4,690,877 A | 9/1987 | Gabano et al. |
| 4,725,927 A | 2/1988 | Morimoto et al. |
| 4,740,436 A | 4/1988 | Kobayashi et al. |
| 5,079,109 A | 1/1992 | Takami et al. |
| 5,219,684 A | 6/1993 | Wilkinson et al. |
| 5,368,958 A | 11/1994 | Hirai et al. |
| 5,460,905 A | 10/1995 | Skotheim |
| 5,462,566 A | 10/1995 | Skotheim |
| 5,523,179 A | 6/1996 | Chu |
| 5,529,860 A | 6/1996 | Skotheim et al. |
| 5,532,077 A | 7/1996 | Chu |
| 5,582,623 A | 12/1996 | Chu |
| 5,587,253 A | 12/1996 | Gozdz et al. |
| 5,648,187 A | 7/1997 | Skotheim |
| 5,744,262 A | 4/1998 | Cheng et al. |
| 5,789,108 A | 8/1998 | Chu |
| 5,797,428 A | 8/1998 | Miller |
| 5,814,420 A | 9/1998 | Chu |
| 5,919,587 A | 7/1999 | Mukherjee et al. |
| 5,961,672 A | 10/1999 | Skotheim et al. |
| 5,962,171 A | 10/1999 | Boguslavsky et al. |
| 6,030,720 A | 2/2000 | Chu et al. |
| 6,090,504 A | 7/2000 | Sung et al. |
| 6,117,590 A | 9/2000 | Skotheim et al. |
| 6,162,562 A | 12/2000 | Tsuji et al. |
| 6,174,621 B1 | 1/2001 | Skotheim et al. |
| 6,201,100 B1 | 3/2001 | Gorkovenko et al. |
| 6,210,831 B1 | 4/2001 | Gorkovenko et al. |
| 6,245,465 B1 | 6/2001 | Angell et al. |
| 6,302,928 B1 | 10/2001 | Xu et al. |
| 6,319,633 B1 | 11/2001 | Ikeda et al. |
| 6,344,293 B1 | 2/2002 | Geronov |
| 6,358,643 B1 | 3/2002 | Katz |
| 6,376,123 B1 | 4/2002 | Chu |
| 6,537,704 B1 | 3/2003 | Akashi et al. |
| 6,544,691 B1 | 4/2003 | Guidotti |
| 6,613,480 B1 | 9/2003 | Hwang et al. |
| 6,632,573 B1 | 10/2003 | Nimon et al. |
| 6,706,449 B2 | 3/2004 | Mikhaylik et al. |
| 6,733,924 B1 | 5/2004 | Skotheim et al. |
| 6,797,428 B1 | 9/2004 | Skotheim et al. |
| 7,108,942 B1 | 9/2006 | Gan et al. |
| 7,250,233 B2 | 7/2007 | Choi et al. |
| 7,335,440 B2 | 2/2008 | Aamodt et al. |
| 7,354,680 B2 | 4/2008 | Mikhaylik et al. |
| 2001/0008736 A1 | 7/2001 | Fanta et al. |
| 2002/0022181 A1 | 2/2002 | Tsujioka et al. |
| 2002/0034688 A1 | 3/2002 | Chu et al. |
| 2002/0039677 A1 | 4/2002 | Iwamoto et al. |
| 2002/0045101 A1 | 4/2002 | Hwang et al. |
| 2002/0045102 A1 | 4/2002 | Youngiu et al. |
| 2002/0102466 A1 | 8/2002 | Hwang et al. |
| 2002/0168574 A1 | 11/2002 | Ahn et al. |
| 2002/0192557 A1 | 12/2002 | Choi et al. |
| 2003/0073005 A1 | 4/2003 | Kim et al. |
| 2003/0175596 A1 | 9/2003 | Park et al. |
| 2003/0180611 A1 | 9/2003 | Mikhaylik et al. |
| 2003/0190530 A1 | 10/2003 | Yang et al. |
| 2004/0002002 A1 | 1/2004 | Mitzuta et al. |
| 2004/0028999 A1 | 2/2004 | LaLiberte |
| 2004/0048164 A1 | 3/2004 | Jung et al. |
| 2004/0053129 A1 | 3/2004 | Jung et al. |
| 2004/0072066 A1 | 4/2004 | Cho et al. |
| 2004/0091776 A1 | 5/2004 | Hwang |
| 2004/0096750 A1 | 5/2004 | Kim et al. |
| 2004/0101753 A1 | 5/2004 | Hwang |
| 2004/0137330 A1 | 7/2004 | Lee et al. |
| 2004/0157132 A1 | 8/2004 | Kim et al. |
| 2004/0219428 A1 | 11/2004 | Nagayama |
| 2004/0222768 A1 | 11/2004 | Moore et al. |
| 2004/0258996 A1 | 12/2004 | Kim et al. |
| 2005/0136327 A1 | 6/2005 | Miyake et al. |
| 2005/0156575 A1 | 7/2005 | Mikhaylik |
| 2005/0221192 A1 | 10/2005 | Hennige et al. |
| 2005/0238956 A1 | 10/2005 | Lee |
| 2005/0244693 A1 | 11/2005 | Strutt et al. |
| 2006/0024579 A1 | 2/2006 | Kolosnitsyn et al. |
| 2006/0051643 A1 | 3/2006 | Sarkar et al. |
| 2006/0105233 A1 | 5/2006 | Morita |
| 2006/0121355 A1 | 6/2006 | Kolosnitsyn et al. |
| 2006/0177741 A1 | 8/2006 | Kolosnitsyn et al. |
| 2006/0204856 A1 | 9/2006 | Ryu et al. |
| 2006/0234126 A1 | 10/2006 | Kolosnitsyn et al. |
| 2006/0238203 A1* | 10/2006 | Kelley ............ G01R 31/3679 324/433 |
| 2006/0292451 A1 | 12/2006 | Lee et al. |
| 2007/0072076 A1 | 3/2007 | Kolosnitsyn et al. |
| 2007/0281210 A1 | 12/2007 | Kolosnitsyn et al. |
| 2008/0038645 A1 | 2/2008 | Kolosnitsyn et al. |
| 2008/0060189 A1 | 3/2008 | Daidoji et al. |
| 2008/0100264 A1 | 5/2008 | Kolosnitsyn et al. |
| 2009/0053565 A1 | 2/2009 | Iacovelli |
| 2009/0111029 A1 | 4/2009 | Lee et al. |
| 2009/0246626 A1 | 10/2009 | Tasaki et al. |
| 2009/0317717 A1 | 12/2009 | Ryu et al. |
| 2010/0129724 A1 | 5/2010 | Kolosnitsyn et al. |
| 2010/0231168 A1 | 9/2010 | Kolosnitsyn et al. |
| 2011/0059361 A1 | 3/2011 | Wilkening et al. |
| 2012/0282530 A1 | 11/2012 | Chiang et al. |
| 2012/0293114 A1 | 11/2012 | Murochi et al. |
| 2012/0315553 A1 | 12/2012 | Fuminori et al. |
| 2015/0147656 A1 | 5/2015 | Kogetsu et al. |

FOREIGN PATENT DOCUMENTS

| | | |
|---|---|---|
| EP | 924783 | 6/1999 |
| EP | 710995 | 3/2001 |
| EP | 1176659 | 1/2002 |
| EP | 1178555 | 2/2002 |
| EP | 1400996 | 3/2004 |
| EP | 1420475 | 5/2004 |
| EP | 1865520 | 12/2007 |
| EP | 1962364 | 8/2008 |
| EP | 2023461 | 2/2009 |
| EP | 2026402 | 2/2009 |
| EP | 2259376 | 12/2010 |
| GB | 2084391 | 4/1982 |
| GB | 2200068 | 7/1988 |
| JP | 59194361 | 11/1984 |
| JP | 64-107467 | 4/1989 |
| JP | 01-124969 | 5/1989 |
| JP | 08069812 | 3/1996 |
| JP | 8-138742 | 5/1996 |
| JP | 08138650 | 5/1996 |
| JP | 8298229 | 11/1996 |
| JP | 8298230 | 11/1996 |
| JP | 09-027328 | 1/1997 |

(56) References Cited

FOREIGN PATENT DOCUMENTS

| | | |
|---|---|---|
| JP | 9147913 | 6/1997 |
| JP | 63-081767 | 4/1998 |
| JP | 10284076 | 10/1998 |
| JP | 11-273729 | 10/1999 |
| JP | 2001-167751 | 6/2001 |
| JP | 2001167751 | 6/2001 |
| JP | 2002-75446 | 3/2002 |
| JP | 2005-071641 | 3/2005 |
| JP | 2005-108724 | 4/2005 |
| JP | 2005-005215 | 6/2005 |
| JP | 2005-243342 | 9/2005 |
| JP | 2006134785 | 5/2006 |
| JP | 2009-087728 | 4/2009 |
| JP | 2011108469 | 6/2011 |
| JP | 2011-192574 | 9/2011 |
| KR | 10-2002-0089134 | 11/2002 |
| KR | 10-0368753 | 4/2003 |
| KR | 10-2003-0056497 | 7/2003 |
| KR | 10-2011-0024707 | 3/2011 |
| WO | 2001-047088 | 6/2001 |
| WO | 197304 | 12/2001 |
| WO | 2002-095849 | 11/2002 |
| WO | 2004021475 | 3/2004 |
| WO | 2006-050117 | 5/2006 |
| WO | 2007-111988 | 10/2007 |
| WO | 2007-132994 | 11/2007 |

OTHER PUBLICATIONS

Suo et al. "A New Class of Solvent-in-Salt Electrolyte for High-Energy Rechargeable Metallic Lithium Batteries" Nature Communications, 2013, vol. 4, p. 1481.
UK Search Report, Application No. GB 0416708.6, Section 17, dated Aug. 10, 2004.
UK Search Report, Application No. GB 0501001.2, dated Apr. 14, 2005.
Japanese Office Action for JP Application No. 2007-550839 dated Apr. 1, 2014.
Korean Office Action for Application No. 10-2013-7031637, dated Jan. 27, 2014.
International Search Report, Application No. PCT/GB2005/002850, dated Aug. 25, 2005.
Written Opinion, Application No. PCT/GB2005/002850, dated Aug. 25, 2005.
International Preliminary Report on Patentability, Application No. PCT/GB2005/002850, dated Jan. 30, 2007.
International Search Report, Application No. PCT/GB2006/000103, dated Jun. 20, 2007.
Written Opinion, Application No. PCT/GB2006/000103, dated Jun. 20, 2007.
International Preliminary Report on Patentability, Application No. PCT/GB2006/000103, dated Jul. 24, 2007.
International Search Report, Application No. PCT/GB2006/050300, dated Dec. 6, 2006.
Written Opinion, Application No. PCT/GB2006/050300, dated Dec. 6, 2006.
International Preliminary Report on Patentability, Application No. PCT/GB2006/050300, dated Mar. 26, 2008.
International Search Report, PCT Application No. PCT/GB2012/051633, dated Feb. 1, 2013.
Written Opinion, PCT Application No. PCT/GB2012/051633, dated Feb. 1, 2013.
International Preliminary Report on Patentability, PCT Application No. PCT/GB2012/051633, dated Jun. 17, 2014.
International Search Report, PCT Application No. PCT/GB2012/052728, dated Jan. 2, 2013.
Written Opinion, PCT Application No. PCT/GB2012/052728, dated Jan. 2, 2013.
International Preliminary Report on Patentability, PCT Application No. PCT/GB2012/052728, dated Aug. 19, 2014.
International Search Report, Application No. PCT/GB2014/05088, dated Jul. 7, 2014.
Written Opinion, Application No. PCT/GB2014/05088, dated Jul. 7, 2014.
International Preliminary Report on Patentability, Application No. PCT/GB2014/050888, dated Sep. 29, 2015.
International Search Report, Application No. PCT/GB2014/050890, dated Jun. 2, 2014.
Written Opinion, Application No. PCT/GB2014/050890, dated Jun. 2, 2014.
International Preliminary Report on Patentability, Application No. PCT/GB2014/050890, dated Sep. 29, 2015.
International Search Report, Application No. PCT/GB2014/050891, dated Jul. 24, 2014.
Written Opinion, Application No. PCT/GB2014/050891, dated Jul. 24, 2014.
International Preliminary Report on Patentability, Application No. PCT/GB2014/050891, dated Sep. 29, 2015.
International Search Report, Application No. PCT/GB2014/052474, dated Nov. 5, 2014.
Written Opinion, Application No. PCT/GB2014/052474, dated Nov. 5, 2014.
International Preliminary Report on Patentability, Application No. PCT/GB2014/052474, dated Feb. 16, 2016.
International Search Report, Application No. PCT/GB2014/053715, dated Feb. 27, 2015.
Written Opinion, Application No. PCT/GB2014/053715, dated Feb. 27, 2015.
International Preliminary Report on Patentability, Application No. PCT/GB2014/053715, dated Jun. 21, 2016.
International Search Report, Application No. PCT/GB2014/053719, dated Feb. 24, 2015.
Written Opinion, Application No. PCT/GB2014/053719, dated Feb. 24, 2015.
International Preliminary Report on Patentability, Application No. PCT/GB2014/053719, dated Jun. 21, 2016.
Cowie et al. "Ion Conduction in Macroporous Polyethylene Film Doped With Electrolytes" Solid State Ionics 109 (1998) 139-144.
U.S. Appl. No. 12/527,701, filed Jun. 18, 2009, Kolosnitsyn et al.
U.S. Appl. No. 11/190,203, filed Jul. 27, 2005, Kolosnitsyn et al.
U.S. Appl. No. 11/332,471, filed Jan. 17, 2006, Kolosnitsyn et al.
U.S. Appl. No. 11/386,113, filed Mar. 22, 2006, Kolosnitsyn et al.
U.S. Appl. No. 60/721,062, filed Sep. 28, 2005, Kolosnitsyn et al.
Bates et al., "Solvent Effects on Acid-Base Behavior: Five Uncharged Acids in Water-Sulfolane Solvents", 1976, Journal of Solution Chemistry, vol. 5, No. 3, p. 213-222.
Definitions of "slurry" and "suspension", Merriam Webster's, Collegiate Dictionary (10th Edition), printed Feb. 4, 2008.
Komaba et al., "Inorganic Electrolyte Additives to Supress the Degradation of Graphite Anodes by Dissolved Mn(II) for Lithium Ion Batteries", Mar. 2003, Journal of Power Sources, 1190121, p. 378-382.
Chagnes et al., "Butyrolactone-Ethylene Carbonate Based Electrolytes for Lithium Ion Batteries", Jul. 2003, Journal of Applied Electrochemistry, 33, p. 589-595.
Yamin H., Peled E, "Electrochemistry of a Nonaqueous Lithium/Sulphur Cell", J of Power Sources, 1983, vol. 9, p. 281-287.
D. Aurbach, E. Zinigrad, Y. Cohen, H. Teller, "A Short Review of Failure Mechanisms of Lithium Metal and Lithiated Graphite Anodes in Liquid Electrolyte Solutions", Solid State Ionics, 2002, vol. 148, p. 405-416.
Duck-Rye Chang, Suck-Hyun Lee, Sun-Wook Kim, Hee-Tak Kim, "Binary Electrolyte Based on Tetra (ethylene glycol) Dimethyl Ether and 1,3-dioxolane for Lithium-Sulphur Battery", J. Power Sources, 2002, vol. 112, p. 452-460.
Yamin H., Penciner J., Gorenshtein A., Elam M., Peled E., "The Electrochemical Behavior of Polysulphides in Tetrahydrofuran", J. of Power Sources, 1985, vol. 14, p. 129-134.
Yamin H., Gorenshtein A., Penciner J., Sternberg Y., Peled E., "Lithium Sulphur Battery Oxidation/Reduction Mechanisms of Polysulphides in THF Solution", J. Electrochem Soc. 1988, vol. 135, No. 5, p. 1045-1048.

(56) References Cited

OTHER PUBLICATIONS

J. Paris, V. Plichon, "Electrochemical Reduction of Sulphur in Dimethylacetamide", Electrochimica Acta, 1981, vol. 26, No. 12, p. 1823-1829.

Levillain E., Gaillard F., Leghie P., Demortier A., Lelieu J.P., "On the Understanding of the Reduction of Sulphur (S8) in Dimethylformamide (DMF)", J. of Electroanalytical Chemistry, 1997, vol. 420, p. 167-177.

Peled E., Gorenshrein A., Segal M., Sternberg Y., "Rechargeable Lithium-Sulphur Battery (extended abstract)", J. of Power Sources, 1989, vol. 26, p. 269-271.

Peled E., Sternberg Y., Gorenshtein A., Lavi Y., "Lithium-Sulphur Battery: Evaluation of Dioxolane-Based Electrolytes", J. Electrochem Soc., 1989, vol. 136, No. 6, p. 1621-1625.

Rauh R.D. Abraham K.M., Pearson G.F., Surprenant J.K., Brummer S.B., "A Lithium/Dissolved Sulphur Battery with an Organic Electrolyte", J. Electrochem Soc., 1979, vol. 126, No. 4, p. 523-527.

Rauh R.D., Shuker F.S., Marston J.M., Brummer S.B., "Formation of Lithium Polysulphides in Aprotic Media", J. inorg. Nucl Chem, 1977, vol. 39, p. 1761-1766.

Shin-Ichi Tobishima, Hideo Yamamoto, Minoru Matsuda, "Study on the Reduction Species of Sulfur by Alkali Metals in Nonaqueous Solvents", Electrochimica Acta, 1997, vol. 42, No. 6, p. 1019-1029.

Taitiro Fujinaga, Tooru Kuwamoto, Satoshi Okazaki, Masashi Horo, "Electrochemical Reduction of Elemental Sulphur in Acetonitrile", Bull Chem. Soc. Jpn. 1980, vol. 53, p. 2851-2855.

Gholam-Abbas Nazri, Gianfranco Pistoia, "Lithium Batteries: Science and Technology", 2003, p. 509-573, Hardcover, ISBN: 978-1-4020-7628-2.

Office Action, U.S. Appl. No. 11/290,825, dated Jun. 11, 2009.
Office Action, U.S. Appl. No. 11/526,876, dated Oct. 30, 2009.
Office Action, U.S. Appl. No. 11/190,203, dated Oct. 9, 2009.
Office Action, U.S. Appl. No. 11/190,203, dated Apr. 3, 2009.
Office Action, U.S. Appl. No. 11/332,471, dated Jul. 31, 2009.
Office Action, U.S. Appl. No. 11/332,471, dated Feb. 26, 2009.
Office Action, U.S. Appl. No. 11/332,471, dated Aug. 27, 2008.
Office Action, U.S. Appl. No. 11/332,471, dated Sep. 28, 2007.
Office Action, U.S. Appl. No. 11/332,471, dated Mar. 11, 2008.
Office Action, U.S. Appl. No. 11/332,471, dated Feb. 20, 2007.
Office Action, U.S. Appl. No. 11/332,471, dated Aug. 21, 2007.
Office Action, U.S. Appl. No. 11/386,113, dated Jan. 6, 2009.
Office Action, U.S. Appl. No. 11/386,113, dated Aug. 19, 2008.
Office Action, U.S. Appl. No. 11/386,113, dated Feb. 5, 2008.
Notice of Allowance, U.S. Appl. No. 11/386,113, dated Jul. 24, 2009.
Office Action, U.S. Appl. No. 11/889,334, dated Aug. 14, 2009.
"Transportation Regulations for Lithium, Lithium Ion and Polymer Cells and Batteries", Ultralife Batteries, Inc. Rev. H, Dec. 18, 2003.
V.S. Kolosnitsyn, L.V. Sheina and S.E. Mochalov, "Physicochemical and Electrochemical Properties of Sulfolane Solutions of Lithium Salts", May 2008, p. 575-578, MAIK Nauka/Interperiodica distributed exclusively by Springer Science+Business Media, LLC.

* cited by examiner

METHOD OF CYCLING A LITHIUM-SULPHUR CELL

The present invention relates to a method of cycling a lithium-sulphur battery. The present invention also relates to a battery management system for cycling a lithium-sulphur battery.

BACKGROUND

A typical lithium-sulphur cell comprises an anode (negative electrode) formed from lithium metal or a lithium metal alloy, and a cathode (positive electrode) formed from elemental sulphur or other electroactive sulphur material. The sulphur or other electroactive sulphur-containing material may be mixed with an electrically conductive material, such as carbon, to improve its electrical conductivity. Typically, the carbon and sulphur are ground and then mixed with a solvent and binder to form a slurry. The slurry is applied to a current collector and then dried to remove the solvent. The resulting structure is calendared to form a composite structure, which is cut into the desired shape to form a cathode. A separator is placed on the cathode and a lithium anode placed on the separator. Electrolyte is then introduced into the assembled cell to wet the cathode and separator.

Lithium-sulphur cells are secondary cells. When a lithium-sulphur cell is discharged, the sulphur in the cathode is reduced in two-stages. In the first stage, the sulphur (e.g. elemental sulphur) is reduced to polysulphide species, $S_n^{2-}$ (n≥2). These species are generally soluble in the electrolyte. In the second stage of discharge, the polysulphide species are reduced to lithium sulphide, $Li_2S$, which, typically, deposits on the surface of the anode.

When the cell is charged, the two-stage mechanism occurs in reverse, with the lithium sulphide being oxidised to lithium polysulphide and thereafter to lithium and sulphur. This two-stage mechanism can be seen in both the discharging and charging profiles of a lithium-sulphur cell. Accordingly, when a lithium-sulphur cell is charged, its voltage typically passes through an inflexion point as the cell transitions between the first and second stage of charge.

Lithium-sulphur cells may be (re)charged by applying an external current to the cell. Typically, the cell is charged to a fixed cut-off voltage of, for example, 2.45-2.8. However, with repeated cycling over an extended period, the capacity of the cell may fade. Indeed, after a certain number of cycles, it may no longer be possible to charge the cell to the fixed cut-off voltage because of the increasing internal resistance of the cell. By repeatedly charging the cell to the selected cut-off voltage, the cell may eventually be repeatedly overcharged. This can have a detrimental effect on the longevity of the cell, as undesirable chemical reactions may lead to degradation, for example, the cell's electrodes and/or electrolytes In view of the foregoing, it is desirable to avoid overcharging the lithium-sulphur cell. WO 2007/111988 describes a process for determining when a lithium sulphur cell is fully charged. Specifically, this reference describes adding an N—O additive, such as lithium nitrate, to the electrolyte of the cell. According to the passage at page 16, lines 29 to 31, of this reference, the additive is effective in providing a charge profile with a sharp increase in voltage at the point of full charge. Accordingly, if the cell voltage during charge is monitored, charging can be terminated once this rapid increase in voltage is observed.

The method of WO 2007/111988 relies on the voltage of the cell increasing very sharply as the cell reaches full capacity. Not all lithium-sulphur cells, however, exhibit such a charging profile.

SUMMARY OF THE INVENTION

According to the present invention, there is provided a method for cycling a lithium-sulphur cell, said method comprising:
 i) discharging a lithium-sulphur cell,
 ii) terminating the discharge when the voltage of the cell reaches a threshold discharge voltage that is in the range of 1.5 to 2.1V,
 iii) charging the lithium-sulphur cell, and
 iv) terminating the charge when the voltage of the cell reaches a threshold charge voltage that is in the range of 2.3 to 2.4V,
 wherein the lithium-sulphur cell is not fully charged at the threshold charge voltage, and
 wherein the lithium-sulphur cell is not fully discharged at the threshold discharge voltage.

Without wishing to be bound by any theory, it has been found that the rate of capacity fade can advantageously be reduced by under-charging and, optionally, under discharging the lithium-sulphur cell. When a lithium-sulphur cell is fully charged, the electroactive sulphur material, such as elemental sulphur, typically exists in its fully oxidised form (e.g. $S_8$). In this form, the electroactive sulphur material is typically non-conducting.

Accordingly, when such a material (e.g. elemental sulphur) deposits on the cathode, the resistance of the cathode may increase. This may result in temperature increases, which, with prolonged cycling, may cause faster degradation of the cell's components. This, in turn, may reduce the capacity of the cell, and increase the rate of capacity fade. Similarly, when the cell is in its fully discharged state, lithium sulphide deposits on the negative electrode. This can also have the effect of increasing the cell's resistance. By under-charging and, optionally, under-discharging the cell, the amount of non-conducting species produced may be reduced, thereby reducing the resistance of the cell and the tendency for capacity fade.

In one embodiment, the cell is charged to points where a significant proportion of the cathodic sulphur material (e.g. elemental sulphur) is still dissolved in the electrolyte (e.g. as polysulphide). The cell may also be discharged to points where a significant proportion of the cathodic sulphur material (e.g. elemental sulphur) is still dissolved in the electrolyte (e.g. as polysulphide). Preferably, the points at which charge and, optionally, discharge are terminated occur when at least 80% of the cathodic sulphur material is dissolved in the electrolyte (e.g. as polysulphide). The percentage of cathodic sulphur material dissolved in solution can be determined by known methods, for example, from the amount of residual solid sulphur in a cell as a percentage of the initial amount of sulphur material introduced as the cathodic material.

The threshold discharge voltage is 1.5 to 2.1V, for example, 1.5 to 1.8 V or from 1.8 V to 2.1V. Suitable threshold discharge voltages range from 1.6 to 2.0 V, for example, 1.7 to 1.9 V. Preferably, the threshold discharge voltage is 1.7 to 1.8 V, preferably about 1.75 V.

Preferably, the threshold charge voltage is about 2.30 to 2.36 V, more preferably, 2.30 to 2.35V, yet more preferably 2.31 to 2.34V, for example, 2.33V.

In one embodiment, steps i) to iv) are repeated for at least 2 discharge-charge cycles, preferably for at least 20 discharge-charge cycles, more preferably for at least 100 cycles, for example, throughout the useful lifetime of the cell.

In one embodiment, the method further comprises the step of monitoring the voltage of the cell during charge and/or discharge.

The present invention also provides a battery management system for carrying out the method described above.

According to yet a further aspect of the present invention, there is provided a battery management system for controlling the discharging and charging of a lithium-sulphur cell, said system comprising means for terminating the discharge of a lithium-sulphur cell at a threshold discharge voltage that is greater than the voltage of the cell in its fully discharged state, means for charging the lithium-sulphur cell, and means for terminating the charge at a threshold charging voltage that is lower than the voltage of the cell in its fully charged state.

Preferably, the system comprises means for monitoring the voltage of the cell during discharge and charge.

In one embodiment, the means for terminating the discharge of the cell terminates the discharge when the voltage of the cell is at 1.5 to 1.8, preferably at 1.7 to 1.8 V, for example, about 1.75 V.

Alternatively or additionally, the means for terminating the charge of the cell terminates the charge when the voltage of the cell is 2.3 to 2.4 V. Preferably, the charge voltage is terminated at about 2.30 to 2.36 V, more preferably, 2.30 to 2.35V, yet more preferably 2.31 to 2.34V, for example, 2.33V.

The system may include means for coupling the system to a lithium-sulphur cell or battery. Preferably, the system includes a lithium sulphur cell or battery.

BRIEF DESCRIPTION OF THE DRAWINGS

Advantages of the present invention will become apparent to those skilled in the art with the benefit of the following detailed description of embodiments and upon reference to the accompanying drawings in which.

DETALED DESCRIPTION OF THE PREDERRED EMBODIMENTS

Figure 1:
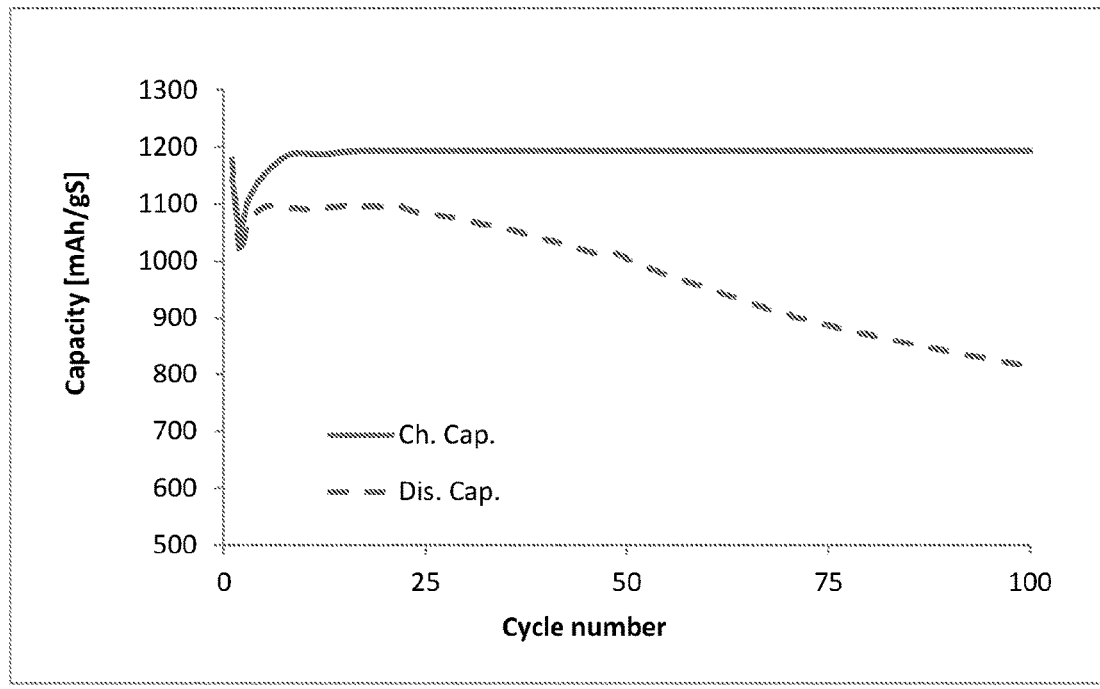
FIG. 1 depicts the charge-discharge curve of a lithium-sulphur cell that is cycled by charging to a fixed voltage of 2.45 V and discharged to a fixed voltage of 1.5V.

In a preferred embodiment, the lithium-sulphur cell is charged by supplying electric energy at constant current. The current may be supplied so as to charge the cell in a time ranging from 30 minutes to 12 hours, preferably 8 to 10 hours. The current may be supplied at a current density ranging from 0.1 to 3 mA/cm$^2$, preferably 0.1 to 0.3 mA/cm$^2$. As an alternative to charging at a constant current, it may also be possible to charge the lithium-sulphur cell to a constant voltage until the relevant capacity is reached.

The electrochemical cell may be any suitable lithium-sulphur cell. The cell typically includes an anode, a cathode, an electrolyte and, preferably, a porous separator, which may advantageously be positioned between the anode and the cathode. The anode may be formed of lithium metal or a lithium metal alloy. Preferably, the anode is a metal foil electrode, such as a lithium foil electrode. The lithium foil may be formed of lithium metal or lithium metal alloy.

The cathode of the electrochemical cell includes a mixture of electroactive sulphur material and electroconductive material. This mixture forms an electroactive layer, which may be placed in contact with a current collector.

The mixture of electroactive sulphur material and electroconductive material may be applied to the current collector in the form of a slurry in a solvent (e.g. water or an organic solvent). The solvent may then be removed and the resulting structure calendared to form a composite structure, which may be cut into the desired shape to form a cathode. A separator may be placed on the cathode and a lithium anode placed on the separator. Electrolyte may then be introduced into the assembled cell to wet the cathode and separator.

The electroactive sulphur material may comprise elemental sulphur, sulphur-based organic compounds, sulphur-based inorganic compounds and sulphur-containing polymers. Preferably, elemental sulphur is used.

The solid electroconductive material may be any suitable conductive material. Preferably, this solid electroconductive material may be formed of carbon. Examples include carbon black, carbon fibre and carbon nanotubes. Other suitable materials include metal (e.g. flakes, filings and powders) and conductive polymers. Preferably, carbon black is employed.

The weight ratio of electroactive sulphur material (e.g. elemental sulphur) to electroconductive material (e.g. carbon) may be 1 to 30:1; preferably 2 to 8:1, more preferably 5 to 7:1.

The mixture of electroactive sulphur material and electroconductive material may be a particulate mixture. The mixture may have an average particle size of 50 nm to 20 microns, preferably 100 nm to 5 microns.

The mixture of electroactive sulphur material and electroconductive material (i.e. the electroactive layer) may optionally include a binder. Suitable binders may be formed from at least one of, for example, polyethyelene oxide, polytetrafluoroethylene, polyvinylidene fluoride, ethylene-propylene-diene rubber, methacrylate (e.g. UV-curable methacrylate), and divinyl esters (e.g. heat curable divinyl esters).

As discussed above, the cathode of the electrochemical cell may further comprise a current collector in contact with the mixture of electroactive sulphur material and solid electroconductive material. For example, the mixture of electroactive sulphur material and solid electroconductive material is deposited on the current collector. A separator is also disposed between the anode and the cathode of the electrochemical cell. For example, the separator may be in contact with the mixture of electroactive sulphur material and solid electroconductive material, which, in turn, is in contact with the current collector.

Suitable current collectors include metal substrates, such as foil, sheet or mesh formed of a metal or metal alloy. In a preferred embodiment, the current collector is aluminium foil.

The separator may be any suitable porous substrate that allows ions to move between the electrodes of the cell. The porosity of the substrate should be at least 30%, preferably at least 50%, for example, above 60%. Suitable separators include a mesh formed of a polymeric material. Suitable polymers include polypropylene, nylon and polyethylene. Non-woven polypropylene is particularly preferred. It is possible for a multi-layered separator to be employed.

Preferably, the electrolyte comprises at least one lithium salt and at least one organic solvent. Suitable lithium salts include at least one of lithium hexafluorophosphate ($LiPF_6$), lithium hexafluoroarsenate ($LiAsF_6$), lithium perchlorate ($LiClO_4$), lithium trifluoromethanesulfonimide ($LiN(CF_3SO_2)_2$)), lithium borofluoride and lithium trifluoromethanesulphonate ($CF_3SO_3Li$). Preferably the lithium salt is lithium trifluoromethanesulphonate.

Suitable organic solvents are tetrahydrofurane, 2-methyltetrahydrofurane, dimethylcarbonate, diethylcarbonate, ethylmethylcarbonate, methylpropylcarbonate, methylpropylpropionate, ethylpropylpropionate, methyl acetate, dimethoxyethane, 1, 3-dioxolane, diglyme (2-methoxyethyl ether), tetraglyme, ethylene carbonate, propylene carbonate, γ-butyrolactone, dioxolane, hexamethyl phosphoamide, pyridine, dimethyl sulfoxide, tributyl phosphate, trimethyl phosphate, N, N, N, N-tetraethyl sulfamide, and sulfone and their mixtures. Preferably, the organic solvent is a sulfone or a mixture of sulfones. Examples of sulfones are dimethyl sulfone and sulfolane. Sulfolane may be employed as the sole solvent or in combination, for example, with other sulfones.

The organic solvent used in the electrolyte should be capable of dissolving the polysulphide species, for example, of the formula $S_n^{2-}$, where n=2 to 12, that are formed when the electroactive sulphur material is reduced during discharge of the cell.

The concentration of lithium salt in the electrolyte is preferably 0.1 to 5M, more preferably 0.5 to 3M, for example, 1M. The lithium salt is preferably present at a concentration that is at least 70%, preferably at least 80%, more preferably at least 90%, for example, 95 to 99% of saturation.

In one embodiment, the electrolyte comprises lithium trifluoromethanesulphonate and sulfolane.

The weight ratio of electrolyte to the total amount of electroactive sulphur material and electroconductive material is 1-15:1; preferably 2-9:1, more preferably 6-8:1.

EXAMPLES

FIG. 1 depicts the charge-discharge curve of a lithium-sulphur cell that is cycled by charging to a fixed voltage of 2.45 V and discharged to a fixed voltage of 1.5V.

Figure 2:
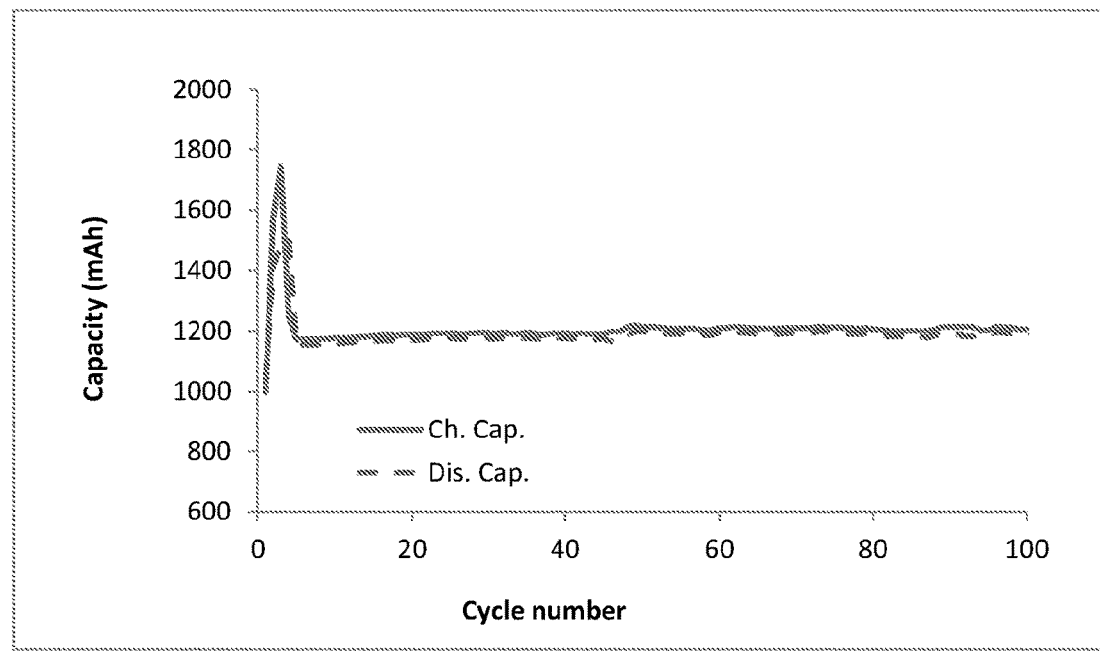
FIG. 2 depicts the charge-discharge curve of a lithium-sulphur cell that is cycled by charging to 2.33V and discharging to 1.75V.

FIG. 2 depicts the charge-discharge curve of a lithium-sulphur cell that is cycled by in accordance with an embodiment of the present invention by (under)charging to 2.33V and (under)discharging to 1.75V. Both cells were manufactured in the same manner to the same specifications. As can be seen from the Figures, the rate of capacity fade is reduced by cycling the cell according to the present invention.

In the following Examples, substantially identical lithium-sulphur pouch cells having an OCV (open circuit voltage) of approximately 2.45 V were used.

Each cell was subjected to a pre-cycling regime which involved discharging the cell at C/5 followed by 3 charge/discharge cycles at C/5 discharge and C/10 charge, respectively, based on 70% of theoretical capacity using a voltage range of 1.5-2.45V.

All charge/discharge half cycles are subjected to C/10 and C/5 rates, respectively.

Figure 8:
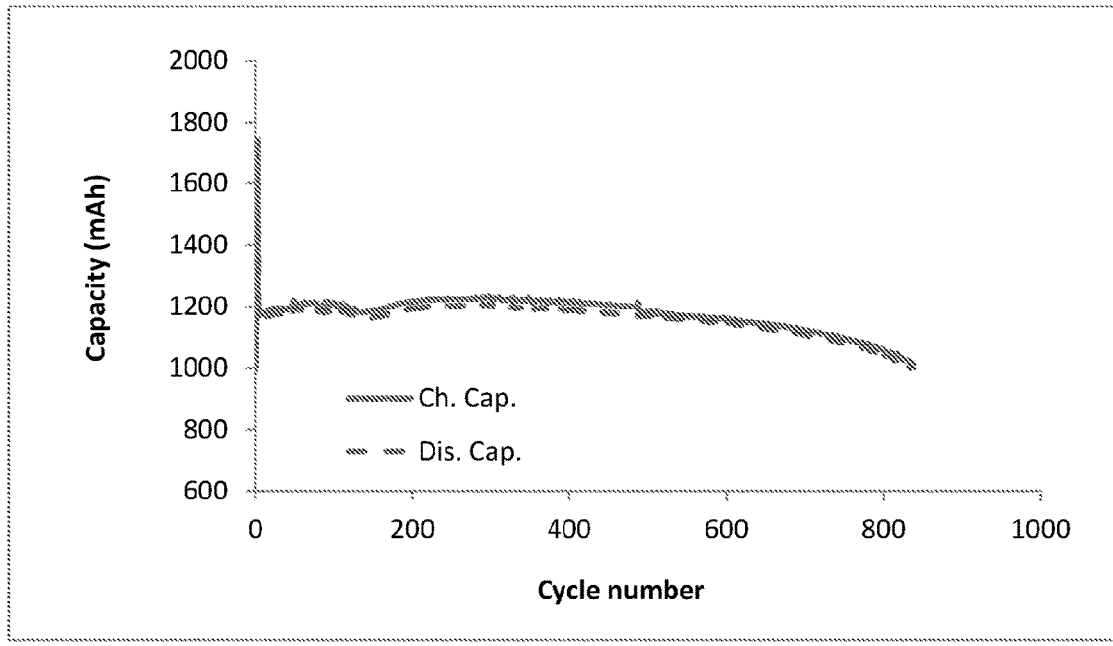
FIG. 8 depicts the charge-discharge curve of a lithium-sulphur cell that is cycled by charging to 2.33V and discharging to 1.75V.
Figure 9:
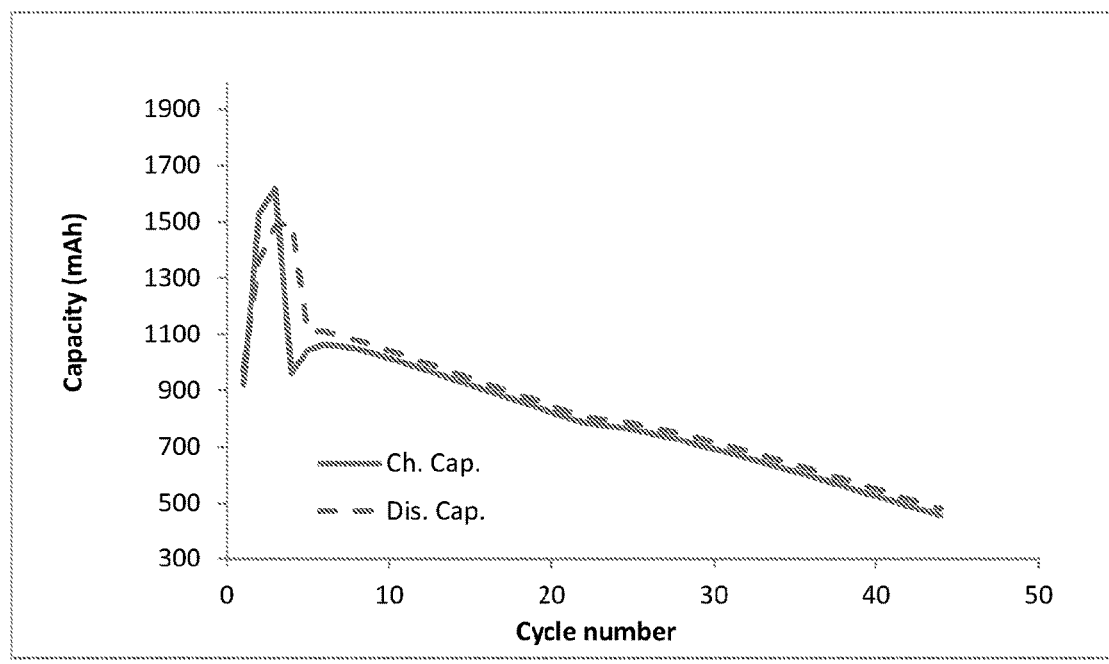
FIG. 9 depicts the charge-discharge curve of a lithium-sulphur cell that is cycled by charging to 2.25V and discharging to 1.75V.

The following discharge charge voltages were tested:
1.75 V-2.45 V (FIG. 3)
1.95 V-2.45 V (FIG. 4)
1.5V-2.4 V (FIG. 5)
1.95 V-2.4 V (FIG. 6)
1.5 V-2.33 V (FIG. 7)
1.75 V-2.33 V (FIG. 8)
1.75 V-2.25 V (FIG. 9)

Figure 3:
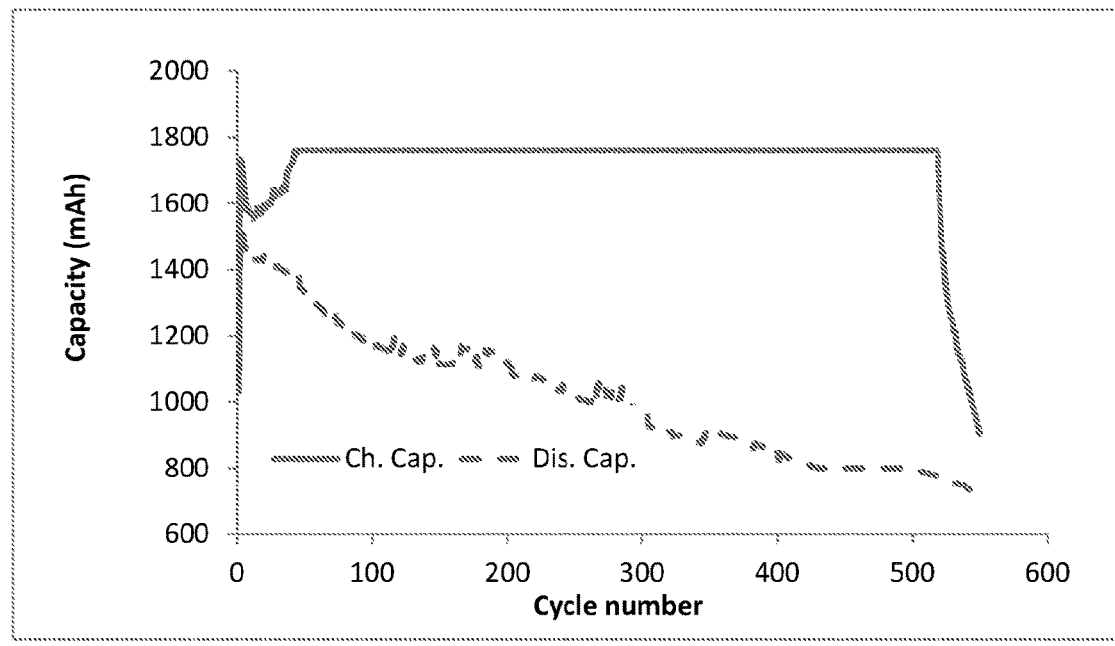
FIG. 3 depicts the charge-discharge curve of a lithium-sulphur cell that is cycled by charging to 2.45V and discharging to 1.75V.
Figure 4:
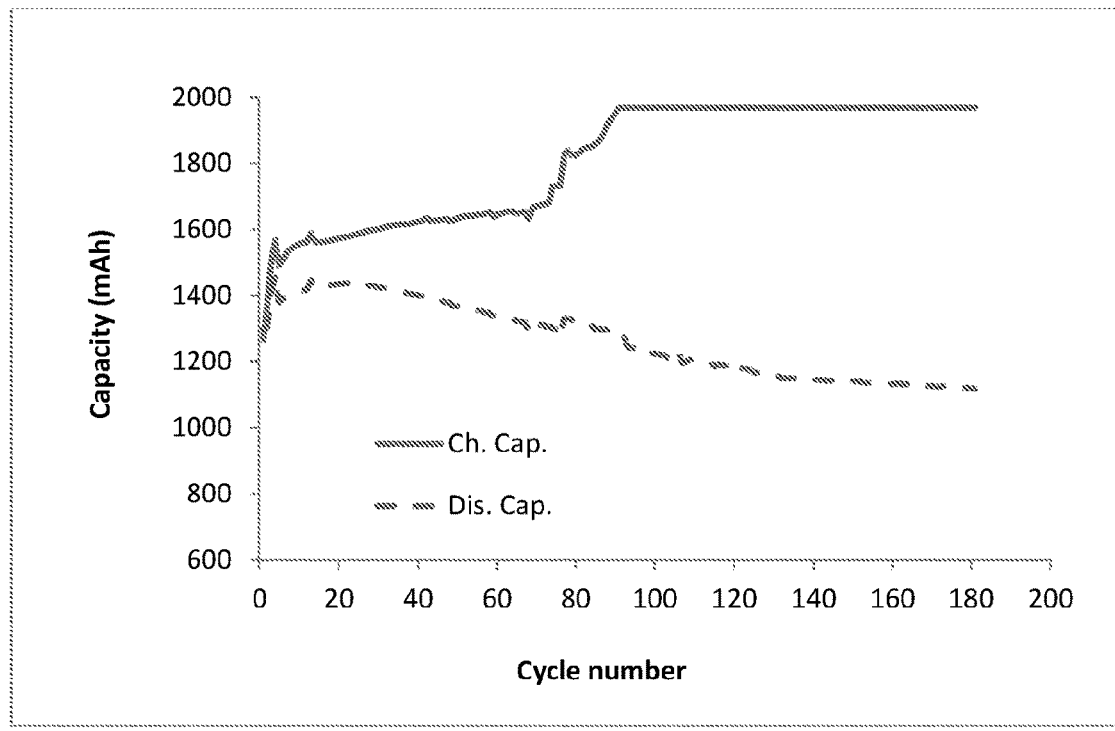
FIG. 4 depicts the charge-discharge curve of a lithium-sulphur cell that is cycled by charging to 2.45V and discharging to 1.95V.
Figure 5:
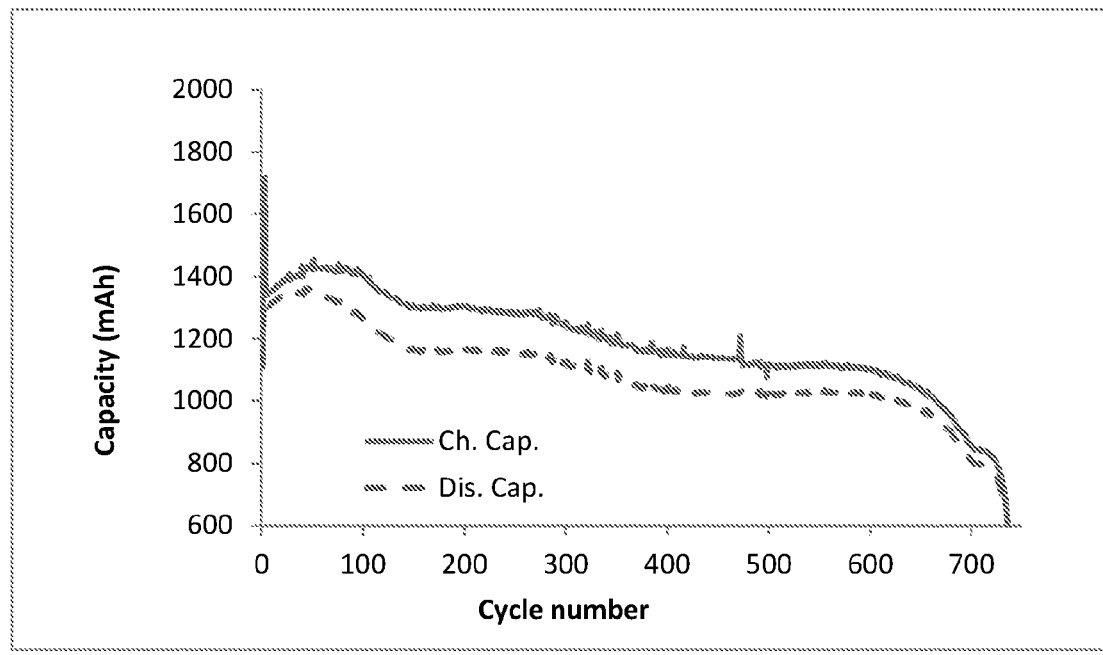
FIG. 5 depicts the charge-discharge curve of a lithium-sulphur cell that is cycled by charging to 2.4V and discharging to 1.5V.
Figure 6:
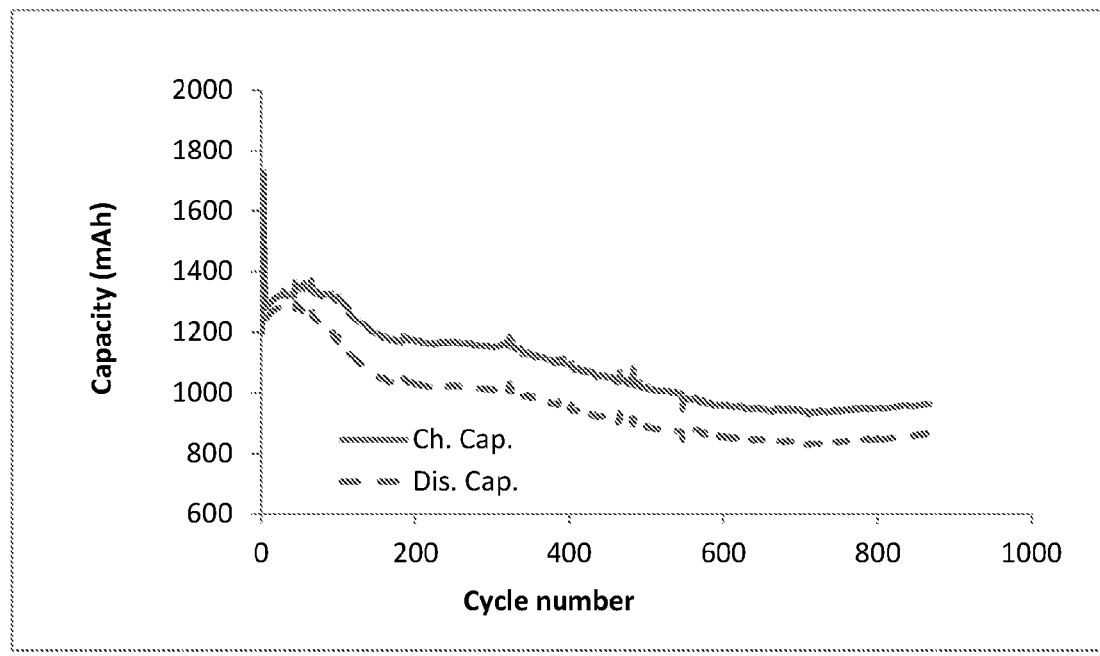
FIG. 6 depicts the charge-discharge curve of a lithium-sulphur cell that is cycled by charging to 2.4V and discharging to 1.95V.
Figure 7:
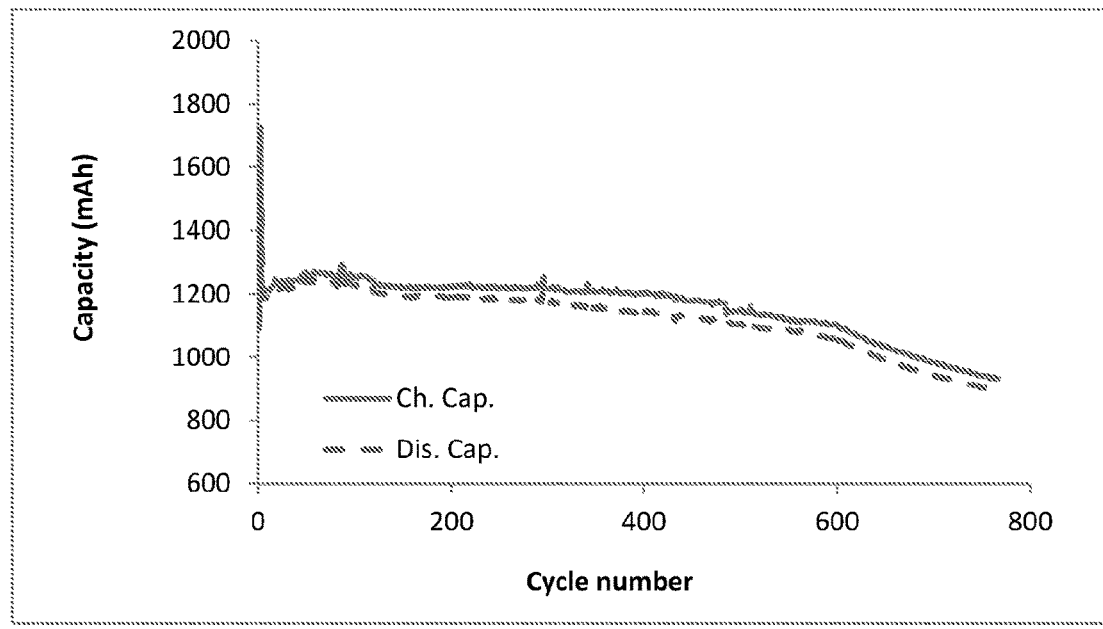
FIG. 7 depicts the charge-discharge curve of a lithium-sulphur cell that is cycled by charging to 2.33V and discharging to 1.5V.

As can be seen from a comparison of FIGS. 5, 6, 7 and 8 with FIGS. 3, 4 and 9, the rate of capacity fade is reduced by cycling the cell according to the present invention. In particular, by charging the cell to 2.33 V, significant improvements in cycle life are observed. These improvement are not achieved when the cell is fully charged to 2.45V (see FIGS. 3 and 4) or under charged to 2.25V (see FIG. 9).

The invention claimed is:

1. A method for cycling a lithium-sulphur cell, said method comprising:
    i) discharging a lithium-sulphur cell,
    ii) terminating the discharge when the voltage of the cell reaches a threshold discharge voltage that is in the range of 1.5 to 2.1V,
    iii) charging the lithium-sulphur cell, and
    iv) terminating the charge when the voltage of the cell reaches a threshold charge voltage that is in the range of 2.3 to 2.4V,
    wherein the lithium-sulphur cell is not fully charged at the threshold charge voltage, and
    wherein the lithium-sulphur cell is not fully discharged at the threshold discharge voltage; and
    wherein the point at which charge is terminated occurs when at least 80% of the cathodic sulphur is dissolved in the electrolyte.

2. The method of claim 1, wherein the threshold discharge voltage is about 1.75V.

3. The method of claim 1, wherein the threshold charge voltage is about 2.33V.

4. The method of claim 1, wherein steps i) to iv) are repeated for at least 2 discharge-charge cycles.

5. The method of claim 1, wherein steps i) to iv) are repeated for at least 20 discharge-charge cycles.

6. The method of claim 1, wherein the point at which discharge is terminated occurs when at least 80% of the cathodic sulphur material is dissolved in the electrolyte.

7. A battery management system for controlling the discharging and charging of a lithium-sulphur cell, said system comprising:
    a termination device coupled to the coupling device, wherein the termination device terminates the discharge of the lithium-sulphur cell at a threshold discharge voltage that is greater than the voltage of the cell in its fully discharged state, a charging device coupled to the coupling device, wherein the charging device is capable of charging the lithium-sulphur cell, and wherein the charging device is configured to terminate charging of the lithium-sulphur cell at a threshold charging voltage that is lower than the voltage of the cell in its fully charged state, and wherein the charging device is configured to terminate charge when at least 80% of the cathodic sulphur is dissolved in the electrolyte.

8. The system of claim 7, further comprising a voltage monitor configured to monitor the voltage of the lithium-sulphur cell during discharge and charge.

9. The system of claim 7, wherein the charging device terminates the discharge when the voltage of the cell is at 1.7 to 1.8 V.

10. The system of claim 7, wherein the charging device terminates the discharge when the voltage of the cell is at about 1.75 V.

11. The system of claim 7, wherein the charging device terminates the charge when the voltage of the cell is at 2.3 to 2.4 V.

12. The system of claim 7, wherein the charging device terminates the charge when the voltage of the cell is about 2.33V.

13. The system of claim 7, further comprising a coupling device configured to receive the lithium-sulfur cell and couple the lithium-sulfur cell to the termination device and the charging device.

14. The system of claim 7, further comprising a lithium sulphur battery.

15. The system of claim 7, wherein the termination device terminates discharge of the lithium-sulphur cell when at least 80% of the cathodic sulphur material is dissolved in the electrolyte.

* * * * *